United States Patent
Homer et al.

(10) Patent No.: US 9,130,925 B2
(45) Date of Patent: *Sep. 8, 2015

(54) PERSONALIZED SECURITY MANAGEMENT

(71) Applicant: Fiserv, Inc., Brookfield, WI (US)

(72) Inventors: Robert T. Homer, Cumming, GA (US); Mary Elizabeth Lawson, Westerville, OH (US); Donald Kenneth Hobday, Blacklick, OH (US); Hans Daniel Dreyer, Pataskala, OH (US)

(73) Assignee: FISERV, INC., Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/287,998

(22) Filed: May 27, 2014

(65) Prior Publication Data

US 2014/0337942 A1 Nov. 13, 2014

Related U.S. Application Data

(63) Continuation of application No. 12/827,576, filed on Jun. 30, 2010, now Pat. No. 8,756,705.

(60) Provisional application No. 61/222,273, filed on Jul. 1, 2009.

(51) Int. Cl.
*G06F 15/16* (2006.01)
*G06F 17/30* (2006.01)
*H04L 29/06* (2006.01)
*G06F 21/31* (2013.01)
(Continued)

(52) U.S. Cl.
CPC ............... *H04L 63/08* (2013.01); *G06F 21/31* (2013.01)

(58) Field of Classification Search
CPC .......................... H04L 63/08; H04L 63/0815
USPC ................ 713/153–154, 187–188, 193–194; 726/1, 6, 13, 22–33; 709/206, 249, 389
See application file for complete search history.

(56) References Cited

U.S. PATENT DOCUMENTS 6,018,724 A 1/2000 Arent
6,412,073 B1 6/2002 Rangan
(Continued)

OTHER PUBLICATIONS

Non-Final Office Action for U.S. Appl. No. 12/827,576 mailed Dec. 12, 2012.
(Continued)

*Primary Examiner* — Evans Desrosiers
(74) *Attorney, Agent, or Firm* — Sutherland Asbill & Brennan LLP

(57) ABSTRACT

Systems and methods for personalized security management of online applications are provided. A determination may be made that a condition for constructing an increased authentication proposal for access to an online financial service is satisfied. The increased authentication proposal may be associated with (i) a user of the online financial service and (ii) a user request option associated with the online financial service. Based upon the determination that the condition is satisfied, the increased authentication proposal may be generated and transmitted for presentation to the user. An increased authentication proposal response may then be received, and the increased authentication proposal response may be processed in order to store, in association with the user and the user request option, (i) an indication of an increased authentication condition and (ii) an indication of an increased authentication mechanism.

21 Claims, 5 Drawing Sheets

(51) Int. Cl.
*H04L 9/32* (2006.01)
*G06F 15/173* (2006.01)

(56) References Cited

U.S. PATENT DOCUMENTS 6,857,073 B2 2/2005 French et al.
7,203,845 B2 4/2007 Sokolic et al.
2003/0226017 A1* 12/2003 Palekar et al. ............... 713/168
2007/0130471 A1* 6/2007 Walker Pina et al. ......... 713/182
2011/0213688 A1* 9/2011 Santos et al. .................. 705/34

OTHER PUBLICATIONS

Final Office Action for U.S. Appl. No. 12/827,576 mailed Jul. 11, 2013.

* cited by examiner

PERSONALIZED SECURITY MANAGEMENT

CROSS-REFERENCE TO RELATED APPLICATION

The present application claims benefit of U.S. Provisional Application No. 61/222,273, filed Jul. 1, 2009 and entitled "Personalized Security Management," and U.S. application Ser. No. 12/827,576, filed Jun. 30, 2010 and entitled "Personalized Security Management," the disclosure of which is incorporated by reference herein in its entirety.

FIELD OF THE INVENTION

Aspects of the invention relate generally to online transactions, and more particularly to systems and methods that facilitate security management for online transactions.

BACKGROUND OF THE INVENTION

A wide variety of transactions, such as banking and payment transactions, are conducted utilizing the Internet. Typically, consumers utilize a user device, such as a personal computer, to interact with an online server that facilitates an online transaction. Various forms of security have been utilized to protect against fraud in online transactions. These conventional security techniques typically involve some form of user authentication and access control, such as the verification of a user name and password, to authenticate a user prior to allowing access to an online application or online functionality.

However, the establishment of authentication requirements and techniques is often dictated by the service provider or application that facilitates and controls the online transactions. Thus, in conventional security systems, a user often has little control over the level of security applied to various online functionality, types of transactions, and/or specific transactions. Additionally, even if a user is permitted to alter a level of security that is applied, the user is often unable to readily determine situations in which increased security is desirable.

BRIEF DESCRIPTION OF THE DRAWINGS

Reference will now be made to the accompanying drawings, which are not necessarily drawn to scale, and wherein.

DETAILED DESCRIPTION

Figure 1:
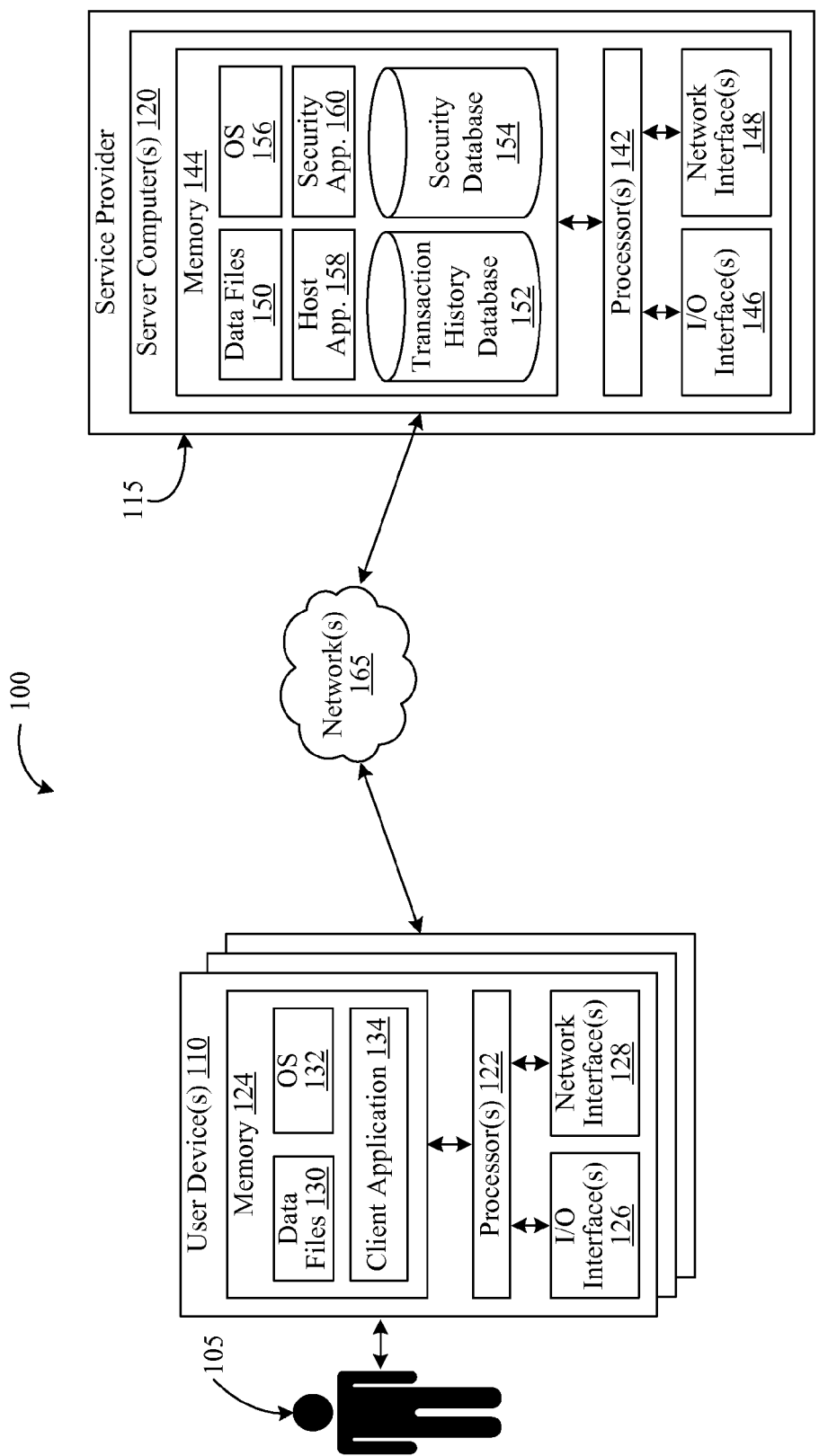
FIG. 1 illustrates an overview of an example system for providing security in an online environment, according to an example embodiment of the invention.

The invention will now be described more fully hereinafter with reference to the accompanying drawings, in which example embodiments of the invention are shown. This invention may, however, be embodied in many different forms and should not be construed as limited to the example embodiments set forth herein; rather, these example embodiments are provided so that this disclosure will be thorough and complete, and will fully convey the scope of the invention to those of ordinary skill in the art. Like numbers refer to like elements throughout.

Embodiments of the invention may provide systems, methods, apparatus, means, mechanisms, and/or techniques for constructing increased authentication proposals associated with online services, online transactions, and/or online applications. In certain embodiments, various conditions and/or parameters associated with the construction or generation of an increased authentication proposal may be utilized to analyze or evaluate one or more user requests. A determination may be made that one or more conditions for constructing an increased authentication proposal have been satisfied. Based upon determining that the one or more conditions have been satisfied, an increased authentication proposal may be generated. The increased authentication proposal may be associated with a user of an online service, such as an individual user, business user, consumer, customer, subscriber, etc. Additionally, the increased authentication proposal may be associated with a user request option that is associated with the online service. A wide variety of user request options may be associated with a proposal as desired in various embodiments of the invention, such as a user selection of a link (e.g., a hyperlink) or other selectable indicator (e.g., a tab, button, etc.) associated with an online service, a user request to perform or conduct a transaction, and/or any other user request, request criteria, and/or request parameters associated with an online service.

A wide variety of conditions and/or parameters may be utilized as desired in various embodiments of the invention. Examples of suitable conditions include, but are not limited to, function-based conditions, time-based conditions, location-based conditions, and/or parameter-based conditions. In certain embodiments, information associated with a user request option and/or a wide variety of historical transaction information may be analyzed or evaluated utilizing one or more conditions or parameters. Additionally, in certain embodiments, one or more conditions and/or parameters may be determined or constructed utilizing historical transaction information.

Once an increased authentication proposal has been generated, the increased authentication proposal may be transmitted or communicated to a device associated with a user, and the increased authentication proposal may be presented to the user, for example, by visual display and/or audio display. In response to the transmitted increased authentication proposal, an increased authentication proposal response may be received. The increased authentication proposal response may include user preferences and/or instructions associated with increased authentication of various user request options, such as conditions and/or parameters associated with triggering an increased authentication and/or one or more increased authentication mechanisms or techniques that will be utilized. In certain embodiments, a plurality of increased authentication proposals may be generated, and the plurality of increased authentication proposals may be presented to the user. A wide variety of techniques may be utilized as desired to present a plurality of proposals to a user. For example, a set of proposals may be presented simultaneously, one or more subsets of proposals may be presented in a sequential manner, proposals may be presented in a tiered manner, etc. In certain embodiments, a user may select, deselect, and/or modify individual proposals and/or groups of related proposals to generate an increased authentication proposal response.

Based upon a received increased authentication proposal response, one or more indication(s) of one or more increased authentication conditions and one or more indication(s) of one or more increased authentication mechanisms may be stored in association with a user and a relevant user request option. In this regard, a subsequent invocation of the user request option may trigger the identification of the increased authentication condition(s) and the use of the increased authentication mechanism(s). For example, when a user request associated with the user request option is received, a determination may be made that an increased authentication condition has been satisfied and an increased authentication challenge associated with an increased authentication mechanism may be generated for transmission and presentation to the user. An increased authentication challenge response may then be received and evaluated in order to determine whether further processing of the user request is permitted.

I. System Overview

FIG. 1 illustrates an overview of an example system 100 for providing security in an online environment, according to an example embodiment of the invention. The system 100 may be utilized in association with a wide variety of online environments that provide security and/or authentication of users, such as an online banking environment and/or an online payment environment. Additionally, the system 100 may facilitate and/or be associated with a wide variety of different types of online applications, such as an online banking application, an electronic bill presentment application, an electronic bill payment application, a person-to-person payment application, a loan or credit application, an investment or retirement management application, an online trading application, and/or an online purchasing application. In one example embodiment, the system 100 may be utilized in association with an integrated online banking and electronic bill presentment and payment ("EBPP") application.

Additionally, although the applications are described herein as encompassing online or Web applications, embodiments of the invention are equally applicable to other types of environments and applications, such as other computer-based applications, telephone-based applications, or mobile device applications. For example, increased authentication may be provided in a telephone-based bill presentment and payment application utilizing various embodiments of the invention.

Although various computing devices and/or computers are illustrated in FIG. 1, it is appreciated that corresponding entities and/or individuals are associated with each of the computers illustrated. According to various embodiments, there may be: one or more users 105, each associated with one or more user devices 110, such as computers, handheld devices, mobile devices, etc.; and one or more service providers 115, each associated with one or more server computers 120. According to various embodiments, there may be any number of each entity type, and each entity may be associated with any number of suitable computers, computing devices, and/or other devices. For simplicity, the computers, devices, and/or entities may be referenced in the singular, but it is appreciated that the same description applies to embodiments including multiple computers, devices and/or entities. Similarly, for each of the computers described herein, it is appreciated that the computer may include any number of suitable components and/or functionality.

As shown in FIG. 1, one or more user devices 110 may be in communication with the service provider 115 and/or one or more server computers 120 via any number of suitable networks 165, which, as described below, can include one or more separate or shared private and/or public networks, including the Internet or a public switched telephone network. Additionally, although communications are described as network-based communications between computing devices, in certain embodiments, non-computerized communications may be utilized. For example, a user 105 may utilize a telephone as a user device 110 to communicate with an automated dialing system associated with the service provider 115.

According to an aspect of the invention, a user 105 may utilize one or more user devices 110 to communicate with the service provider 115 and/or one or more server computers 120. For example, a user 105 may utilize a personal computer, mobile device, telephone, and/or other user device to communicate with a service provider 115. The user 105 may be any suitable individual or entity that is provided with a service, such as an EBPP service or other service by the service provider 115. For example, the user 105 may be an individual or a business. In certain embodiments, the user 105 may have registered or enrolled for a service that is provided by the service provider 115. For example, the user 105 may have enrolled for an EBPP service either directly with the service provider 115 or with another entity that has contracted with the service provider 115 to facilitate provision of the EBPP service. The service provider 115 may include any entity that is configured to provide services and/or functionality, such as an online service, to any number of users. Examples of service providers include, but are not limited to, financial institutions that provide online services to users, other entities that directly provide online services to users, and/or entities that provide services to users on behalf of financial institutions or other entities. As one example, a financial institution (e.g., a bank) may engage the service provider 115 to provide an EBPP service or other services to customers of the financial institution. For purposes of this disclosure, a user 105 may also be referred to as a consumer, a subscriber, or a customer.

A wide variety of different types of user devices 110 may be utilized as desired in various embodiments. In certain embodiments of the invention, a user device 110 may be a processor-driven device that facilitates electronic communications via the networks 165. Although the user device 110 is described below as a processor-driven device, it will be appreciated that other types of devices, such as telephones, may be utilized by the user 105 to facilitate communication with the service provider 115. With continued reference to FIG. 1, the user device 110 may be any suitable processor-driven device that facilitates communication with the server computer 120 and/or the provision of security and/or authentication information and/or preferences, such as a desktop computer, a personal computer, a digital assistant, a personal digital assistant, a digital tablet, a mobile device, an Internet appliance, an application specific circuit, a minicomputer, or any other processor-based device. The execution of suitable computer-implemented instructions by the user device 110 may form a special purpose computer or other particular machine that is operable to facilitate communication with the server computer 120 and/or the communication of security and/or authentication information to the server computer 120. Although a single user device 110 is described herein, the operations and/or control of the user device 110 may be distributed among any number of devices, computers, and/or processing components.

In addition to having one or more processors 122, the user device 110 may include one or more memory devices 124 or memory, one or more input/output ("I/O") interface(s) 126, and one or more network interface(s) 128. The memory devices 124 may be any suitable memory devices, for example, caches, read-only memory devices, random access memory devices, magnetic storage devices, removable storage devices, etc. The memory devices 124 may store a wide variety of data, such as data files 130. Additionally, the memory devices 124 may store executable instructions and/or various program modules utilized by the user device 110, for example, an operating system ("OS") 132 and/or a client application 134.

The data files 130 may include any suitable data that facilitates the authentication of a user for one or more services and/or applications provided by the service provider 115 and/or the identification, construction, and/or generation of increased authentication proposals. For example, the data files 130 may include authentication data associated with the user, such as user name information, password information, security tokens, etc. Additionally, the data files 130 may include user profile information and/or user preferences associated with the generation of increased authentication proposals and/or the presentation of increased authentication proposals. As desired, stored user profile information and/or preferences may be communicated by the user device 110 to a server computer 120 to facilitate the generation of increased authentication proposals. Additionally, the data files 130 may include a wide variety of stored information that is utilized by the user 105 in association with an online application or service hosted by and/or provided by the service provider 115, such as financial information, bill information, historical transaction information, etc.

The OS 132 may be a suitable software application or software module that controls the general operation of the user device 110. The OS 132 may also facilitate the execution of other software modules by the one or more processors 122, for example, the client application 134. The OS 132 may be, but is not limited to, Microsoft Windows®, Apple OSX™, Linux, Unix, or a mainframe operating system. The client application 134 may be a suitable software application or software module, such as an Internet browser or other dedicated program, that facilitates communication with a host application 158 of the server computer 120.

In operation, the client application 134 may be utilized to access one or more Web pages and/or Universal Resource Locators ("URLs") associated with and/or hosted by the server computer 120. In this regard, a communications session or network session may be established between the user device 110 and the server computer 120. During an established network session, a wide variety of online services and/or online applications hosted by the server computer 120 may be provided to the user 105 via the user device 110. For example, an online EBPP service may be provided to the user 105. During the provision of an online service, the user 105 may utilize the client application 134 to submit a wide variety of different user requests or user request options to the host application 158. A user request may include any suitable request or command that is made by the user in association with a provided service. One example of a user request may include a user selection of a link (e.g., a hyperlink) or other selectable indicator (e.g., a tab, selectable button, etc.) that requests and/or triggers a display of additional information and/or the submission of a user command. For example, the user 105 may select a hyperlink that triggers a request for electronic billing information associated with the user 105. Another example of a user request may include a submission of a request to perform a specific transaction on behalf of the user 105, such as a bill payment or a person-to-person payment. As desired in certain embodiments of the invention, a user request may include any number of parameters. For example, a payment request may include a payment date, a payment amount, an identifier of a financial account etc.

The user 105 may utilize the client application 134 to submit any number of user requests to the server computer 120. As explained in greater detail below, the server computer 120 may generate one or more increased authentication proposals associated with the user requests, and the server computer 120 may communicate at least a portion of the increased authentication proposals to the user device 110 for presentation to the user 105, such as a visual and/or an audio presentation. As explained in greater detail below with reference to FIG. 3, the user 105 may utilize various input/output ("I/O") devices associated with the user device 110 to navigate through, select, deselect, and/or modify any number of increased authentication proposals. The user 105 may then utilize the user device 110 to communicate an increased authentication proposal response to the server computer 120. As desired in various embodiments of the invention, a wide variety of information may be included in an increased authentication proposal response, such as an acceptance of one or more increased authentication proposals, modifications to one or more proposals (e.g., modifications to conditions, parameters, and/or criteria that trigger increased authentication, modifications to authentication mechanisms that will be utilized, etc.), and/or various user preferences associated with increased authentication (e.g., conditions, parameters, and/or criteria that trigger increased authentication, authentication mechanisms that will be utilized for increased authentication, information associated with one or more authentication mechanisms, etc.).

According to an aspect of the invention, one or more authentication challenges may be communicated to the user device 110 by the server computer 120. These authentication challenges may be associated with any number of authentication mechanisms, such as a user name and/or password-based authentication method, a challenge question(s)-based authentication method, a security token-based (e.g., password, digital signature, certificate, hardware-based token) authentication mechanism, various biometric authentication techniques (e.g., fingerprint, voice recognition, retinal scan, etc.), etc. Once increased authentication has been implemented, the server computer 120 may identify a situation in which increased authentication is desired, and the server computer 120 may communicate one or more increased authentication challenges to the client application 134 of the user device 110. The client application 134 may then present the increased authentication challenges to the user 105 via any number of suitable output devices (e.g., a display, a speaker, etc.). In response to an increased authentication challenge, the user 105 may direct the client application 134 to communicate an increased authentication challenge response to the server computer 120. The increased authentication challenge response may include a wide variety of different information as desired in various embodiments of the invention including, but not limited to, information entered and/or selected by the user 105 (e.g., password information, challenge question answers, etc.), information collected from the user 105 by the user device 110 (e.g., biometric information, etc.), various token(s) and/or signatures, etc. Increased authentication challenge responses may then be utilized by the server computer 120 to perform increased authentication on behalf of the user 105. Based upon the increased authentication, the user 105 may be permitted access and/or further access to various services and/or features offered by the server computer 120.

With continued reference to the user device 110, the one or more I/O interfaces 126 may facilitate communication between the user device 110 and one or more input/output devices, for example, one or more user interface devices, such as a display, keypad, mouse, pointing device, control panel, touch screen display, remote control, microphone, speaker, etc., that facilitate user interaction with the user device 110. The one or more network interfaces 128 may facilitate connection of the user device 110 to one or more suitable networks, for example, the networks 165 illustrated in FIG. 1. In this regard, the user device 110 may receive and/or communicate information to other components of the system 100, such as the server computer 120.

With continued reference to FIG. 1, the server computer 120 may be configured to facilitate the provision of any number of services and/or online applications to any number of users. Additionally, the server computer 120 may be configured to authenticate the users and, as desired, identify situations in which increased authentication should be proposed and/or when increased authentication is required. The server computer 120 may be associated with an underlying service provider 115 that provides services to its own subscribers and users and/or that provides services to customers of another entity that has contracted with the service provider 115, such as a financial institution. For example, the service provider 115 may be a financial institution, a biller, a merchant, or another entity that provides services to its customers. As another example, the service provider 115 may be a direct provider of an EBPP service. As another example, the service provider 115 may provide a service, such as an EBPP service, to customers of another entity, such as a financial institution.

The server computer 120 may be any suitable processor-driven device, such as a computer server, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. The execution of suitable computer-implemented instructions by the server computer 120 may form a special purpose computer or other particular machine that is operable to facilitate the provision of one or more services and/or online applications to users, the authentication of users, the generation of increased authentication proposals, and/or the processing of increased authentication proposal responses. Although a single server computer 120 is described herein, the operations and/or control of the server computer 120 may be distributed among any number of computers and/or processing components.

In addition to having one or more processors 142, the server computer 120 may include one or more memory device(s) 144, one or more input/output ("I/O") interface(s) 146, and one or more network interface(s) 148. The memory devices 144 may be any suitable memory devices, for example, caches, read-only memory devices, random access memory devices, magnetic storage devices, removable storage devices, etc. The memory devices 144 may store a wide variety of data and/or data constructs, such as data files 150, a transaction history database 152, and/or a security database 154. Additionally, the memory devices 144 may store executable instructions and/or various program modules utilized by the server computer 120, for example, an operating system ("OS") 156, a host application 158, and/or a security application 160.

The data files 150 may include, for example, any suitable data that facilitates the provision of one or more services and/or online applications by the server computer 120, such as information associated with various Web forms and/or Web pages associated with an online application, a wide variety of account information (e.g., user account information with the service provider 115, user account information with financial institutions, user account information with billers and/or other entities, and/or financial account information associated with billers and/or other entities), billing information, personal payment service information, etc. The transaction history database 152 may include information associated with any number of previous transactions associated with the users of the service provider 115. A wide variety of information may be stored in the transaction history database 152, such as timing information (e.g., time stamps, date stamps, etc.) associated with previous transactions for one or more users, location information (e.g., geographic location and/or network location information) associated with previous transactions for one or more users, any number of parameters associated with previous transactions (e.g., a payment amount, a payee, etc.), etc. Additionally, the transaction history database 152 may store information associated with a wide variety of different types of transactions, such as payment transactions, purchase transactions, information access transactions, etc. The security database 154 may include information associated with the authentication of any number of users and/or the generation or construction of increased authentication proposals. A wide variety of information may be stored in the security database 154, such as user profile information, parameters and/or conditions associated with the generation of increased authentication proposals, increased authentication proposal response information, information associated with security mechanisms and/or security techniques, user validation and challenge response information, etc. Although two databases are illustrated in FIG. 1, any number of databases may be utilized as desired in various embodiments of the invention.

The OS 156 may be a suitable software module that controls the general operation of the server computer 120 and/or the execution of other software modules by the one or more processors 142. The OS 156 may be similar to the OS 132 for the user device 110. The host application 158 or host module may facilitate the hosting of a network session for any number of user devices 110, the communication of information to the user devices 110, and/or the receipt of information from the user devices 110. As such, the host application 158 may include any number of suitable host applications, such as Web servers, email servers, short message service ("SMS") processing applications, automatic call processing applications, etc., including various dedicated applications, that facilitate interaction with a user device 110. As desired, various host applications 158 may be provided and/or customized for access by different financial institutions and/or other entities that contract with the service provider 115 for the provision of services and/or online applications to customers. In certain embodiments, a user device 110 may directly contact the host application 158. In other embodiments, the user device 110 may be routed to or passed off to the host application 158 from another entity, such as a financial institution server or financial institution system. Once a network session has been established between the host application 158 and a client application 134 of a user device, the host application 158 may facilitate the provision of any number of services and/or online applications to the user 105, such as an EBPP application.

The security application 160 or security module may facilitate the authentication of one or more users. In one example embodiment, the security application 160 may generate one or more authentication challenges that are presented to the user 105, for example, via one or more output devices associated with the user device 110. A wide variety of authentication methods may be utilized by the security application 160 to generate authentication challenges. Examples of suitable authentication methods include, but are not limited to, user name and password authentication, challenge question authentication, digital signature authentication, certificate-based authentication, other token-based authentication, biometric-based authentication, hardware-based token authentication (e.g., a value generated by a user device 110, etc.). One or more authentication challenges may be generated by the security application 160 in accordance with any number of selected authentication methods, and the authentication challenge(s) may be communicated to the user device 110 for presentation to the user 105. In response to an authentication challenge, a user 105 and/or a user device 110 may return an authentication challenge response to the server computer 120. The security application 160 may evaluate a received authentication challenge response in an attempt to authenticate the user 105. For example, information included in an authentication challenge response may be compared to stored information that is expected for authentication. Based at least in part upon the comparison, the security application 160 may determine whether or not the user 105 and/or the user device 110 is authenticated. If it is determined that the user 105 is authenticated (i.e., the challenge response is validated), then the security application 160 may approve and/or grant access to service(s), application(s), and/or functionality associated with the authentication method(s). If, however, it is determined that the user 105 is not authenticated (i.e., the challenge response is not validated), then the security application 160 may deny access to service(s), application(s), and/or functionality associated with the authentication method(s). As desired, a user 105 may be provided with several opportunities to provide correct authentication information to the server computer 120.

According to an aspect of the invention, the security application 160 may additionally facilitate the review of any number of user request options in order to identify situations in which increased authentication may be desirable. The security application 160 may then generate one or more increased authentication proposals for presentation to the user 105. A wide variety of different types of user request options may be evaluated by the security application 160 as desired in various embodiments of the invention, such as a user request to access various interfaces and/or functionalities associated with a provided service or online application, a user request to initiate or complete a transaction, etc. In certain embodiments, user request options may be evaluated in real-time or near real-time as user requests are received. In other embodiments, user request options may be evaluated in an asynchronous manner, for example, when an active communications session with the user 105 is not in progress. In one example, user request options may be evaluated on a periodic basis, such as once a day, one a week, etc. As desired, an evaluation periodicity may be determined utilizing one or more user preferences and/or by default preferences. When evaluating a user request option, the security application 160 may utilize any number of suitable evaluation techniques, parameters, and/or conditions in order to determine whether an increased authentication proposal should be generated. Additionally, as desired, the security application 160 may evaluate and/or utilize historical transaction information, such as historical transaction information that is stored in the transaction history database 152. Further, in certain embodiments, the security application 160 may utilize stored user profile information and/or user preference information in its determination of whether increased authentication proposals should be generated. One example of the operations that may be utilized to generate one or more increased authentication proposals is described in greater detail below with reference to FIG. 2.

If it is determined that one or more increased authentication proposals should be generated, then the security application 160 may generate the increased authentication proposal(s). An increased authentication proposal may suggest that additional security mechanisms and/or security techniques be utilized to implement increased authentication for various user request options. The security application 160 may then direct the communication of one or more increased authentication proposals for presentation to the user 105, such as presentation by the user device 110. A wide variety of presentation techniques may be utilized as desired in various embodiments of the invention. For example, a set of increased authentication proposals may be presented, one or more subsets of increased authentication proposals may be presented (e.g., various subsets may be presented in different user sessions), a plurality of tiered presentations may be presented that allow a user 105 to "drill down" to particular user requests and/or groups of requests, etc.

In response to one or more presentations, a user 105 may select and/or accept any number of increased authentication proposals. Additionally, as desired, a user 105 may modify an increased authentication proposal. For example, the user 105 may alter or modify any number of parameters associated with triggering increased authentication and/or desired increased authentication techniques and/or authentication methods. Any number of increased authentication proposal responses may be communicated to the server computer 120 by the user 105 and/or the user device 110. The security application 160 may receive the increased authentication proposal response(s) and utilize the response(s) to establish increased authentication parameters for a user 105. For example, information associated with the user 105 and/or a user request option and associated conditions or parameters that will trigger increased authentication may be stored in a user profile and/or in the security database 154. Additionally, one or more authentication methods or techniques associated with the increased authentication for the user request option may be stored. In this regard, customized increased authentication may be established for any number of user request options associated with the user 105. One example of the operations that may be utilized to present increased authentication proposals, receive increased authentication proposal responses, and/or establish increased authentication parameters is described in greater detail below with reference to FIG. 3.

Once increased authentication has been established, the security application 160 may subsequently utilize the stored increased authentication information to identify situations in which increased authentication is required for the user 105. For example, the security application 160 may evaluate a subsequently received user request option utilizing stored parameters and/or conditions associated with increased authentication for the user 105. If it is determined based upon the evaluation that increased authentication is required for the user request option, then the security application 160 may generate one or more increased authentication challenges for presentation to the user 105. For example, an increased authentication challenge may be generated based upon the stored increased authentication method associated with the user request option. Following the presentation of an increased authentication challenge to the user 105, an increased authentication challenge response may be communicated to and received by the server computer 120. The increased authentication challenge response may be evaluated by the security application 160 in order to authenticate the user 105 and determine whether the user 105 should be granted access to the functionality associated with the user request option. One example of the operations that may be performed to facilitate increased authentication is described in greater below with reference to FIGS. 4-5.

With continued reference to the server computer 120, the one or more I/O interfaces 146 may facilitate communication between the server computer 120 and one or more input/output devices, for example, one or more user interface devices, such as a display, keypad, mouse, pointing device, control panel, touch screen display, remote control, microphone, speaker, etc., that facilitate user interaction with the server computer 120. The one or more network interfaces 148 may facilitate connection of the server computer 120 to one or more suitable networks, for example, the networks 165 illustrated in FIG. 1. In this regard, the server computer 120 may receive and/or communicate information to other components of the system 100, such as the user device 110.

The networks 165 may include any telecommunication and/or data networks, whether public, private, or a combination thereof including, but not limited to, a local area network, a wide area network, an intranet, the Internet, intermediate handheld data transfer devices, public switched telephone networks, and/or any combination thereof and may be wired and/or wireless.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the invention should not be construed as being limited to any particular operating environment, system architecture, or device configuration.

II. Operational Overview

Figure 2:
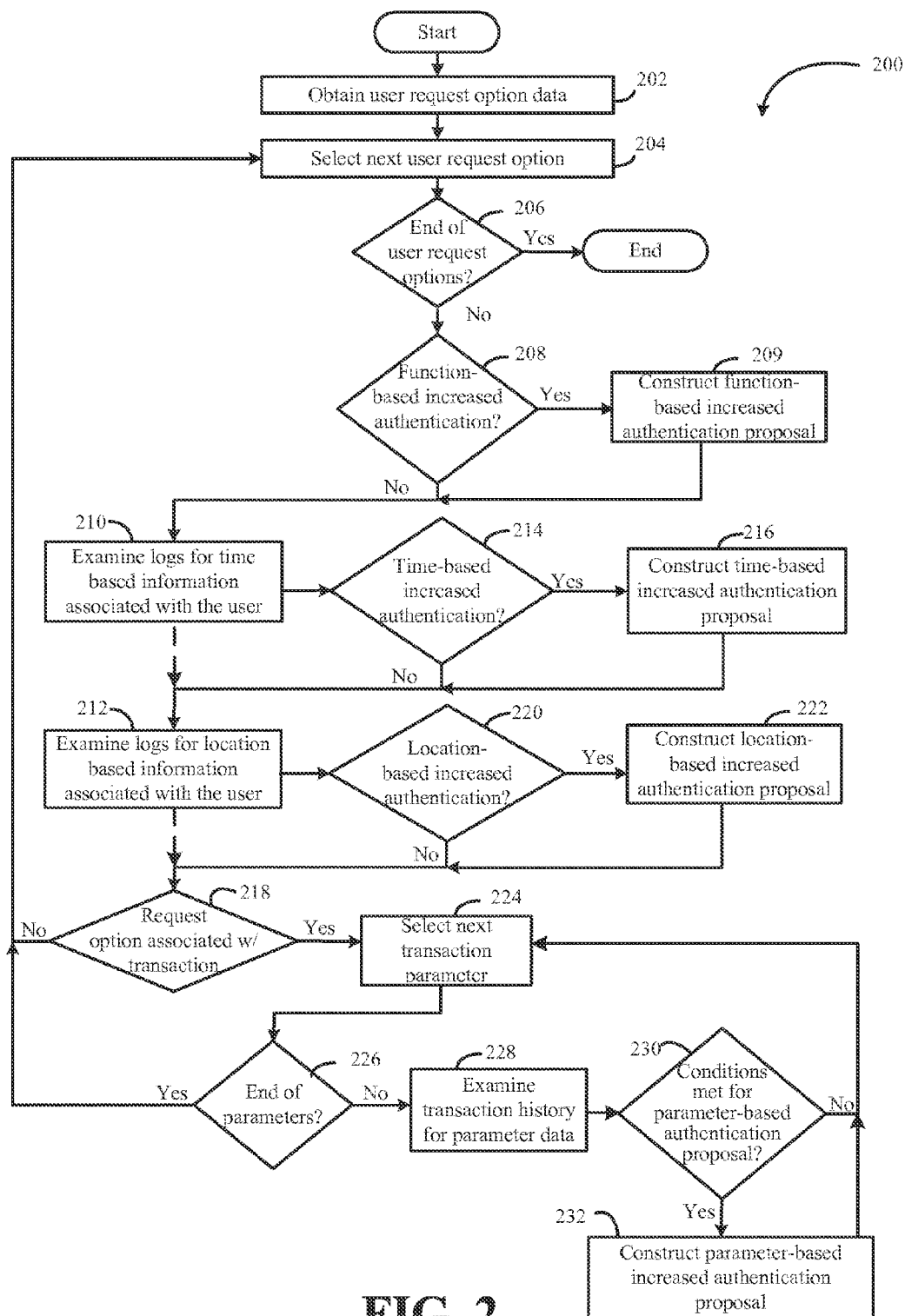
FIG. 2 is a flow diagram of an example method for constructing proposals for increased authentication requirements, according to an example embodiment of the invention.

FIG. 2 is a flow diagram of an example method 200 for constructing proposals for increased authentication requirements, according to an example embodiment of the invention. The method 200 may be performed by one or more server computers associated with a service provider, such as the server computers 120 associated with the service provider 115 of FIG. 1. The method 200 may begin at block 202.

At block 202, user request option data may be obtained for a user, such as the user 105 illustrated in FIG. 1. For example, in certain embodiments, stored information associated with various user requests that have been made in association with services and/or online applications provided to the user may be accessed from memory. In this regard, the user request options may be analyzed in an asynchronous manner outside of any established communications sessions between the user devices 110 and the server computer 120. For example, stored data associated with user request options may be accessed and analyzed in a periodic manner (e.g., once a day, once a week, etc.). As desired, the periodicity for obtaining the stored data may be determined based at least in part upon one or more default parameters and/or user-defined parameters. In other embodiments, user request options may be analyzed in real-time or near real-time as the user requests are received.

Information associated with any number of user request options may be obtained at block 202. At block 204, a next user request option may be selected for analysis. At block 206, a determination may be made as to whether the end of a set of one or more user request options has been reached. If it is determined at block 206 that the end of the user request options has been reached, then the method 200 may end. Otherwise, if it is determined at block 206 that the end has not been reached, then operations may continue at block 208.

During the analysis of a user request option, a wide variety of parameters and/or conditions may be evaluated in order to determine whether an increased authentication proposal should be generated for the user request option. For example, at block 208, a determination may be made as to whether one or more function-based increased authentication parameters are available for the user request option. In a function-based analysis, it may be determined that, if a user request has been received for particular functionality and/or for specific transactions, then an increased authentication proposal should be constructed for the user request irrespective of any of the particular details associated with the user request. Accordingly, a determination may be made as to whether one or more function-based parameters are associated with the selected user request or whether the function-based parameters match a type or category associated with the selected user request. In other words, if the selected user request option is associated with a function for which a function-based increased authentication proposal is recommended, then it may be determined that a function-based increased authentication proposal should be constructed or generated.

As one example, function-based increased authentication may be associated with a functionality tab or other selectable indicator that is presented to a user 105 and that may be selected by the user. If the user 105 submitted a user request option associated with selecting the indicator, then it may be determined that a function-based increased authentication proposal should be constructed. As another example, function-based increased authentication may be associated with a specific type of transaction, such as an "add payment" transaction within an EBPP scenario. If the user request option is a request for an "add payment" transaction (or other specific type of transaction that satisfies a particular function), then it may be determined that a function-based increased authentication proposal should be constructed. As yet another example, function-based increased authentication may be associated with any number of threshold parameters and/or other conditions. For example, a determination may be made that an increased authentication proposal should be constructed if a user request option will cause a cumulative value associated with the number of times the user request option (or similar user requests within a specific category) has been received to exceed a predetermined threshold value, such as an overall threshold value or a threshold value for a predetermined time period. As one example, if an "add payment" request is the Nth "add payment" request received within a predetermined period of time (e.g., one week) and a threshold value of "N" has been established, then it may be determined that a function-based increased authentication proposal should be constructed. The scenarios set forth above for determining whether function-based parameters have been satisfied are provided by way of example only. It will be appreciated that a wide variety of other parameters, conditions, and/or combinations of parameters and/or conditions may be evaluated as desired in various embodiments of the invention.

If it is determined at block 208 that a function-based increased authentication proposal should not be constructed, then operations may continue at block 210. However, if it is determined at block 208 that a function-based increased authentication proposal should be constructed, then operations may continue at block 209 and a function-based increased authentication proposal that is associated with the selected user request option may be constructed. The increased authentication proposal may suggest that the user authorize increased authentication for subsequent instances of the user request option that satisfy certain parameters and/or conditions associated with the function. Operations may then continue at block 210.

At block 210, which may be optional in certain embodiments of the invention, one or more request logs and/or sources of transaction history information may be examined for time-based information associated with the user. A wide variety of time-based information may be examined as desired in various embodiments of the invention. For example, logs associated with received user requests may be examined in order to identify timing information (e.g., a time stamp) associated with the selected user request option. As another example, logs and/or transaction history information may be examined in order to identify timing information associated with previous user requests that are similar to the selected request, such as previous requests falling within a specified category and/or previous requests having a same type as the selected request. If no time-based information is available for the selected request at block 210, then operations may continue at block 212. If, however, time-based information is available for the selected request at block 210, then operations may continue at block 214.

At block 214, a determination may be made as to whether one or more time-based increased authentication parameters are available for and satisfied by the user request option. In a time-based analysis, it may be determined that, if time-based information associated with a user request satisfies various time-based conditions and/or parameters, then an increased authentication proposal should be constructed for the user request. Accordingly, time-based information associated with the user request may be compared to one or more time parameters and/or timing ranges and, based at least in part upon the comparison, a determination may be made as to whether a time-based increased authentication proposal should be generated.

A wide variety of different time-based parameters may be utilized as desired in various embodiments of the invention, such as time thresholds and/or time ranges. For example, time-based parameters may establish criteria that trigger an increased authentication proposal for a user request option that is received between the hours of midnight and 6:00 a.m. Additionally, as desired, time-based parameters may be combined with a wide variety of other parameters, such as types of transactions, transaction counts, etc. For example, if an "add payment" transaction is received between the hours of midnight and 6:00 a.m., then an increased authentication proposal may be generated. An another example, if a user request is received on a weekend day, then an increased authentication proposal may be generated. As yet another example, if a user request is the Nth request received within a particular time range with "N" being a threshold parameter, then an increased authentication proposal may be generated.

In certain embodiments, the evaluation of transaction logs and/or transaction history information may be utilized to generate one or more time parameters and/or conditions associated with time-based increased authentication. For example, timing information associated with previous transactions may be utilized to determine one or more date and/or time ranges in which user requests and/or particular types of user requests are received. Timing information associated with the selected user request option may then be evaluated utilizing these determined date and/or time ranges. If the timing information falls outside of an expected date and/or time range, then a determination may be made to generate an increased authentication proposal for the user request option. The time-based parameters and evaluations described above are provided by way of example only, and any number of time-based parameters and/or evaluation techniques may be utilized as desired in various embodiments of the invention.

If it is determined at block 214 that a time-based increased authentication proposal should not be constructed, then operations may continue at block 212. However, if it is determined at block 214 that a time-based increased authentication proposal should be constructed, then operations may continue at block 216 and a time-based increased authentication proposal that is associated with the selected user request option may be constructed. The increased authentication proposal may suggest that the user authorize increased authentication for subsequent instances of the user request option that satisfy certain timing parameters and/or other conditions. Operations may then continue at block 212.

At block 212, which may be optional in certain embodiments of the invention, one or more request logs and/or sources of transaction history information may be examined for location-based information associated with the user. A wide variety of location-based information may be examined as desired in various embodiments of the invention. For example, logs associated with received user requests may be examined in order to identify geolocation information (e.g., a physical location from which a user request is received) and/or network location information (e.g., a network address from which a user request is received) associated with the selected user request option. As another example, logs and/or transaction history information may be examined in order to identify location information associated with previous user requests that are similar to the selected request, such as previous requests falling within a specified category and/or previous requests having a same type as the selected request. If no location-based information is available for the selected request at block 212, then operations may continue at block 218. If, however, location-based information is available for the selected request at block 212, then operations may continue at block 220.

At block 220, a determination may be made as to whether one or more location-based increased authentication parameters are available for and satisfied by the user request option. In a location-based analysis, it may be determined that, if location-based information associated with a user request satisfies various location-based conditions and/or parameters, then an increased authentication proposal should be constructed for the user request. Accordingly, location-based information associated with the user request may be compared to one or more location parameters and/or approved locations and, based at least in part upon the comparison, a determination may be made as to whether a location-based increased authentication proposal should be generated.

A wide variety of different location-based parameters may be utilized as desired in various embodiments of the invention, such as one or more approved locations (e.g., approved IP addresses, approved ZIP codes, approved satellite-based coordinates, etc.). For example, one or more approved network locations (e.g., IP addresses) may be associated with a user, and a location-based increased authentication proposal may be generated if a user request is received from a network address or network location other than the approved locations. As another example, one or more approved ZIP codes may be associated with a user. When a request is made, a ZIP code associated with a location of a user device 110 may be determined, for example, by utilizing global positioning system ("GPS") coordinates received from the user device 110. A location-based increased authentication proposal may then be generated if the request was not made within an approved ZIP code. As desired, location-based parameters may be combined with a wide variety of other parameters, such as types of transactions, transaction counts, etc., in a similar manner as that described above for time-based parameters. For example, if a request is received from a location other than an approved location and at a time that falls outside of an approved time range, then a location-based increased authentication proposal may be generated.

In certain embodiments, the evaluation of request logs and/or transaction history information may be utilized to identify one or more approved locations and/or other conditions associated with location-based increased authentication. For example, location information associated with previous transactions may be utilized to determine one or more locations in which user requests and/or particular types of user requests are typically received, and the one or more locations may be identified as approved locations. The location-based parameters and evaluations described above are provided by way of example only, and any number of location-based parameters and/or evaluation techniques may be utilized as desired in various embodiments of the invention.

If it is determined at block 220 that a location-based increased authentication proposal should not be constructed, then operations may continue at block 218. However, if it is determined at block 220 that a location-based increased authentication proposal should be constructed, then operations may continue at block 222 and a location-based increased authentication proposal that is associated with the selected user request option may be constructed. The increased authentication proposal may suggest that the user authorize increased authentication for subsequent instances of the user request option that satisfy certain location parameters and/or other conditions. Operations may then continue at block 218.

At block 218, a determination may be made as to whether the selected user request option is associated with a transaction and/or whether the selected user request option is a user request that includes one or more parameters. In this regard, a determination may be made as to whether one or more parameters associated with the user request option may be evaluated for increased authentication proposals. If it is determined at block 218 that the user request option is not associated with a transaction or that the user request option does not include one or more parameters that may be evaluated, then operations may continue at block 204, and a next user request option may be selected for evaluation. If, however, it is determined at block 218 that the user request option is associated with a transaction or that the user request option includes (or is associated with) one or more parameters that may be evaluated, then operations may continue at block 224.

At block 224, a next parameter associated with the selected user request option, such as a next transaction parameter, may be selected for evaluation. At block 226, a determination may be made as to whether the end of a set of one or more parameters associated with the user request option has been reached. If it is determined at block 226 that the end of the parameters has been reached, then operations may continue at block 204 and a next user request option may be selected for evaluation. Otherwise, if it is determined at block 226 that the end has not been reached, then operations may continue at block 228.

At block 228, stored transaction history information and/or other stored information associated with the user request option may be accessed and/or examined in order to obtain a value for the selected parameter. As desired, any number of parameters associated with the user request option may be obtained and/or examined in a similar manner. Although the examination is described as an iterative process, multiple parameters may be obtained and/or evaluated concurrently in certain embodiments of the invention. The obtained value for a parameter may be utilized in a determination of whether to construct a parameter-based increased authentication proposal. For example, the value of a parameter may be compared to one or more conditions and/or threshold values associated with the generation of a parameter-based increased authentication proposal.

A wide variety of different parameters associated with the user request option may be obtained and/or examined as desired in various embodiments of the invention including, but not limited to, a parameter associated with a type for the user request option, an identifier of a payee for a payment transaction, a payment amount associated with the transaction, etc. Additionally, as desired, any number of parameters associated with historical or previous user requests and/or user transactions may be obtained and/or examined as desired in various embodiments of the invention. For example, payment amounts associated with previous payment transactions for the user within a particular time period (e.g., the previous week, previous month, etc.) and/or within a number of previous transactions (e.g., the last ten transactions, etc.) may be obtained and utilized to identify a cumulative payment amount. The parameters set forth above are provided by way of example only, and it will be appreciated that any number of different parameters and/or combinations of parameters may be obtained and examined as desired in various embodiments of the invention.

At block 230, a determination may be made, based upon the examination or evaluation of the parameter, as to whether one or more conditions are met for a parameter-based increased authentication proposal. As stated above, any number of parameters and/or conditions may be compared and/or otherwise analyzed as desired in various embodiments of the invention. For example, determinations may be made as to whether a parameter value equals a conditional value, whether a parameter value is not equal to a conditional value, whether a parameter value is greater than a conditional value, whether a parameter value is less than a conditional value, whether a parameter value falls within a conditional range of values, or whether a parameter value falls outside of a conditional range of values. As desired, if a parameter includes a list of items, then a condition may be deemed satisfied by the parameter if one member of the list satisfies the condition. Additionally, when multiple parameters and/or conditions are associated with triggering an increased authentication proposal, a proposal may be generated if all of the condition is satisfied or if only a portion of the conditions is satisfied. As desired, the conditions may be weighted or prioritized in order to facilitate a determination of whether an increased authentication proposal should be constructed. Additionally, for purposes of this disclosure, the term "condition" may include any number of conditions and/or any number of parameters.

As one example of a parameter-based evaluation, an identifier (e.g., a numerical identifier, string, etc.) for a payee in a payment transaction may be compared to a conditional payee identifier, and an increased authentication proposal may be generated if a match is found. As another example, a payment amount for a payment transaction may be compared to a threshold payment amount, and an increased authentication proposal may be generated if the payment amount exceeds the threshold amount. As yet another example, both a payee identifier and a payment amount may be evaluated and compared to stored, conditional, and/or threshold values. As yet another example, a payment amount for a payment transaction may be added to the payment amounts for one or more previous transactions, and a parameter-based increased authentication proposal may be generated if the total amount exceeds a cumulative threshold value, such as a cumulative threshold for a predetermined time period. A wide variety of other parameter-based evaluations may be utilized as desired in various embodiments of the invention.

If it is determined at block 230 that a parameter-based increased authentication proposal should not be generated (i.e., one or more parameter-based conditions are not satisfied), then operations may continue at block 224 and a next transaction parameter may be selected for evaluation. If, however, it is determined at block 230 that a parameter-based increased authentication proposal should be generated, then operations may continue at block 232. At block 232, a parameter-based increased authentication proposal that is associated with the selected user request option may be constructed. The increased authentication proposal may suggest that the user authorize increased authentication for subsequent instances of the user request option that satisfy certain parameters or conditions. Operations may then continue at block 224, and a next transaction parameter may be selected for evaluation.

In certain embodiments, the generation of increased authentication proposals may be a cumulative process. In other words, a plurality of increased authentication proposals may be generated or constructed for a single user request option and/or increased authentication proposals may be generated for a plurality of evaluated user request options. The increased authentication proposals that are generated based upon the evaluation of one or more user request options may be stored in association with the user 105 for subsequent presentation to the user 105.

Additionally, in certain embodiments, the generation or construction of increased authentication proposals may be based upon a wide variety of different proposal parameters or conditions, which may be default parameters and/or user defined parameters. For example, a user 105 may specify a delay period (e.g., a week, a month, etc.) for generating various instances of certain types of proposals (e.g., function-based proposals, time-based proposals, location-based proposals, parameter-based proposals, etc.). As another example, a user 105 may indicate the types of requests that the user 105 desires to be presented. As yet another example, an increased authentication proposal may be generated if less than or more than a certain percentage of instances of a user request option (or multiple user request options) occurs within certain time parameters and/or when less than or more than a certain percentage of instances of the user request option (or multiple user request options) occurs from one or more IP addresses. Similarly, an increased authentication proposal may be generated if less than or more than a certain percentage of instances of a user request option (or multiple user request options) involves a particular parameter value and/or involve a parameter value that satisfies a threshold.

The method 200 may end following block 206.

Figure 3:
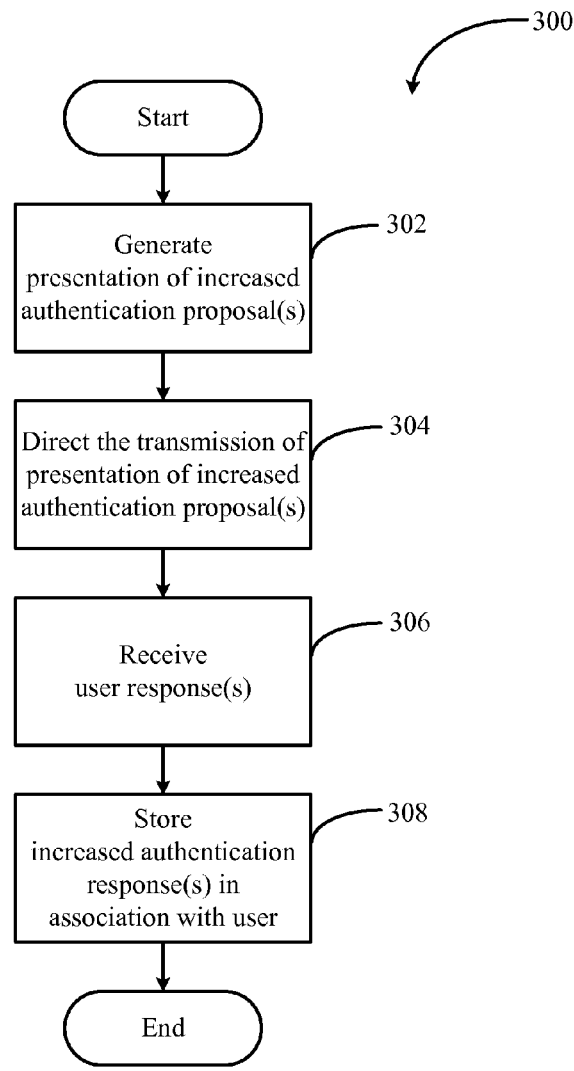
FIG. 3 is a flow diagram of an example method for presenting increased authentication proposals to a user, according to an example embodiment of the invention.

FIG. 3 is a flow diagram of an example method 300 for presenting increased authentication proposals to a user, according to an example embodiment of the invention. The method 300 may be performed by one or more server computers associated with a service provider, such as the server computers 120 associated with the service provider 115 of FIG. 1. The method 300 may begin at block 302.

At block 302, one or more presentations of any number of increased authentication proposals may be generated and/or formatted for presentation to a user, such as the user 105 illustrated in FIG. 1. Each proposal may include any number of selectable options and/or user input fields that permit the user 105 to accept the proposal and/or modify the proposal. For example, a presentation may include one or more checkboxes that permit the user 105 to accept the increased authentication proposals.

A wide variety of different types of presentations may be generated as desired in various embodiments of the invention. For example, all of the generated increased authentication proposals for a user 105 may be situated within a single display window, such as a scrollable display window. As another example, one or more subsets of proposals may be included in any number of respective presentations. These presentations may be sequentially presented to a user 105 for selection, acceptance, and/or modification by the user. As desired, only a portion of a plurality of proposals may be presented to the user 105, and the remaining proposals may be stored for presentation at a subsequent point in time, such as a subsequent user session. As yet another example, tiered presentations may be generated for presentation to a user 105, allowing the user 105 to "drill down" to particular requests and/or types of requests. For example, a user 105 may be able to select proposals directed to payment transactions, and then drill down to proposals for payment requests that are for payments to a particular payee.

At block 304, the presentations for the increased authentication proposals may be transmitted or communicated to a user device, such as the user device 110 illustrated in FIG. 1, for presentation to the user 105. For example, the security application 160 may direct the transmission of one or more presentations to a user device 110. A wide variety of suitable communication techniques may be utilized to communicate presentations to a user device 110, such as one or more web pages that are communicated via a network session established between the user device 110 and the server computer 120, email communications, short message service ("SMS") communications, audio presentations communicated via a telephone connection, etc. In one example embodiment, one or more presentations may be presented to a user 105 when the user 105 accesses an online application. For example, one or more presentations may be presented when a user 105 logs into an online application.

The user 105 may review the presentation(s) of one or more increased authentication proposals, and the user 105 may accept one or more proposals, deny one or more proposals, and/or modify one or more proposals. For example, a user may select or deselect proposals included in a list of proposals. As another example, the user may modify various parameters associated with an increased authentication proposal (e.g., alter a time range, alter an evaluated parameter, alter a threshold value, etc.). As yet another example, a user may generate a new increased authentication proposal. Additionally, as desired, a user may accept or otherwise specify an increased authentication mechanism or method that will be associated with an increased authentication proposal. In addition to presenting increased authentication proposals to the user 105, the user 105 may additionally be permitted to review and/or modify existing increased authentication conditions.

At block 306, one or more increased authentication proposal responses or user responses may be received. As set forth above with respect to the description of FIG. 1, the user responses may include a wide variety of different information, such as an acceptance of one or more proposals, a denial of one or more proposals, modifications to one or more proposals, desired authentication methods associated with one or more proposals, etc. As desired, user responses may be received within a secure environment in order to protect the user. For example, in certain embodiments, user responses may be received after a user has logged into and/or established a secure communications session with a service provider.

At block 308, received increased authentication responses may be processed and increased authentication conditions may be stored in association with the user 105. For example, a received response may be evaluated in order to ensure that an included increased authentication condition (e.g., a condition that will trigger increased authentication) is valid. If the increased authentication condition is valid, then parameters and/or an indication of the increased authentication condition may be stored in association with the user. Additionally, an indication of an authentication method that will be utilized in association with the increased authentication condition may be stored. In this regard, when subsequent user request options are received from the user 105, then user request options may be evaluated in order to determine whether a stored increased authentication condition is satisfied. If a stored condition is satisfied, then the stored increased authentication method may be utilized to construct an increased authentication challenge that is utilized to further authenticate the user 105.

Once a stored increased authentication proposal is processed based upon a received response (e.g., accepted, rejected, etc.), then the proposal may be either deleted or marked as considered in order to prevent repeated presentation to the user 105.

The method 300 may end following block 308.

Figure 4:
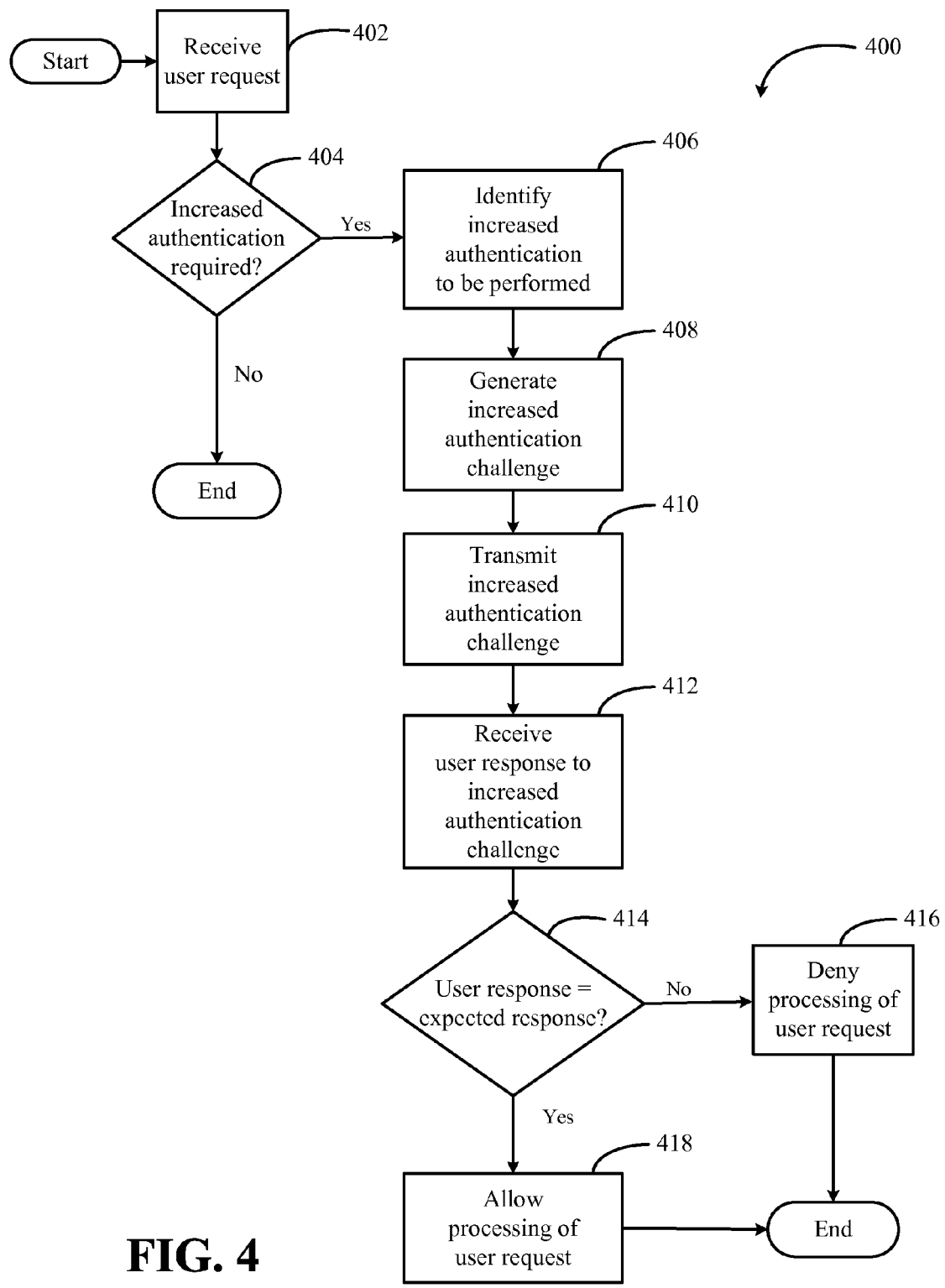
FIG. 4 is a flow diagram of an example method for performing increased authentication associated with a user request, according to an example embodiment of the invention

FIG. 4 is a flow diagram of an example method 400 for performing increased authentication associated with a user request, according to an example embodiment of the invention. The method 400 may be performed by one or more server computers associated with a service provider, such as the server computers 120 associated with the service provider 115 of FIG. 1. The method 400 may begin at block 402.

At block 402, a user request may be received. For example a user request may be received during a communications session that is established between the server computer 120 and a user device, such as the user device 110 illustrated in FIG. 1. A wide variety of different types of user request options may be received as desired in various embodiments of the invention, such as a user selection of a selectable indicator, a request for a specific type of transaction, and/or a request for access to certain functionality and/or information. In certain embodiments, user requests may be received and evaluated in real-time or near real-time while a user, such as the user 105 illustrated in FIG. 1, is in session with a service provider.

At block 404, a determination may be made as to whether increased authentication is required for the user request. In doing so, information and/or parameters associated with the user request may be evaluated in order to determine whether one or more increased authentication conditions are satisfied. A wide variety of increased authentication conditions may be evaluated as desired in various embodiments of the invention, such as function-based conditions, time-based conditions, location-based conditions, parameter-based conditions, and/or other conditions. One example of the operations that may be performed to determine whether increased authentication is required for the user request is described in greater detail below with reference to FIG. 5. If it is determined at block 404 that increased authentication is not required for the user request, then the method 400 may end. If, however, it is determined at block 404 that increased authentication is required for the user request, then operations may continue at block 406.

At block 406, a type of increased authentication to be performed may be identified. In other words, an increased authentication mechanism or method that is associated with the condition that triggered increased authentication may be accessed from memory and/or identified. As desired, multiple types of increased authentication to be performed may be identified. A wide variety of increased authentication mechanisms may be utilized as desired in various embodiments of the invention, such as the increased authentication mechanisms described in greater detail above with reference to FIG. 1.

At block 408, an increased authentication challenge may be generated in accordance with the increased authentication mechanism to be utilized. For example, a request for a password or security token associated with the functionality that is associated with the user request may be generated. As another example, challenge questions may be generated. The generated increased authentication challenge may then be transmitted or otherwise communicated to a user device 110 for presentation to the user 105 at block 410. The authentication challenge may be communicated utilizing a wide variety of different communication techniques, such as the techniques described above with reference to block 304 of FIG. 3.

At block 412, a user response to an increased authentication challenge may be received. For example, a requested password or security token may be received. As another example, an answer to one or more challenge questions may be received. The received response may then be evaluated at block 414 in order to determine whether the response matches an expected response or an expected value. In other words, a determination may be made at block 414 as to whether the received response is a valid response. If it is determined at block 414 that the received user response fails to match or satisfy an expected value (i.e., the response is invalid), then operations may continue at block 416, and further processing of the received user request may be denied. For example, the user 105 may be denied access to certain functionality provided by the service provider 115. As desired, the user 105 may be permitted additional opportunities to provide a valid response to the service provider 115. Any subsequent opportunities may utilize the same authentication method or alternate authentication methods. If, however, it is determined at block 414 that the received user response matches or satisfies an expected value (i.e., the response is valid), then further processing of the user request will be permitted or allowed at block 418. For example, the user may be permitted access to certain functionality associated with the user request. As another example, a requested transaction may be permitted and/or further processed.

The method 400 may end following either block 404, block 416, or block 418.

Figure 5:
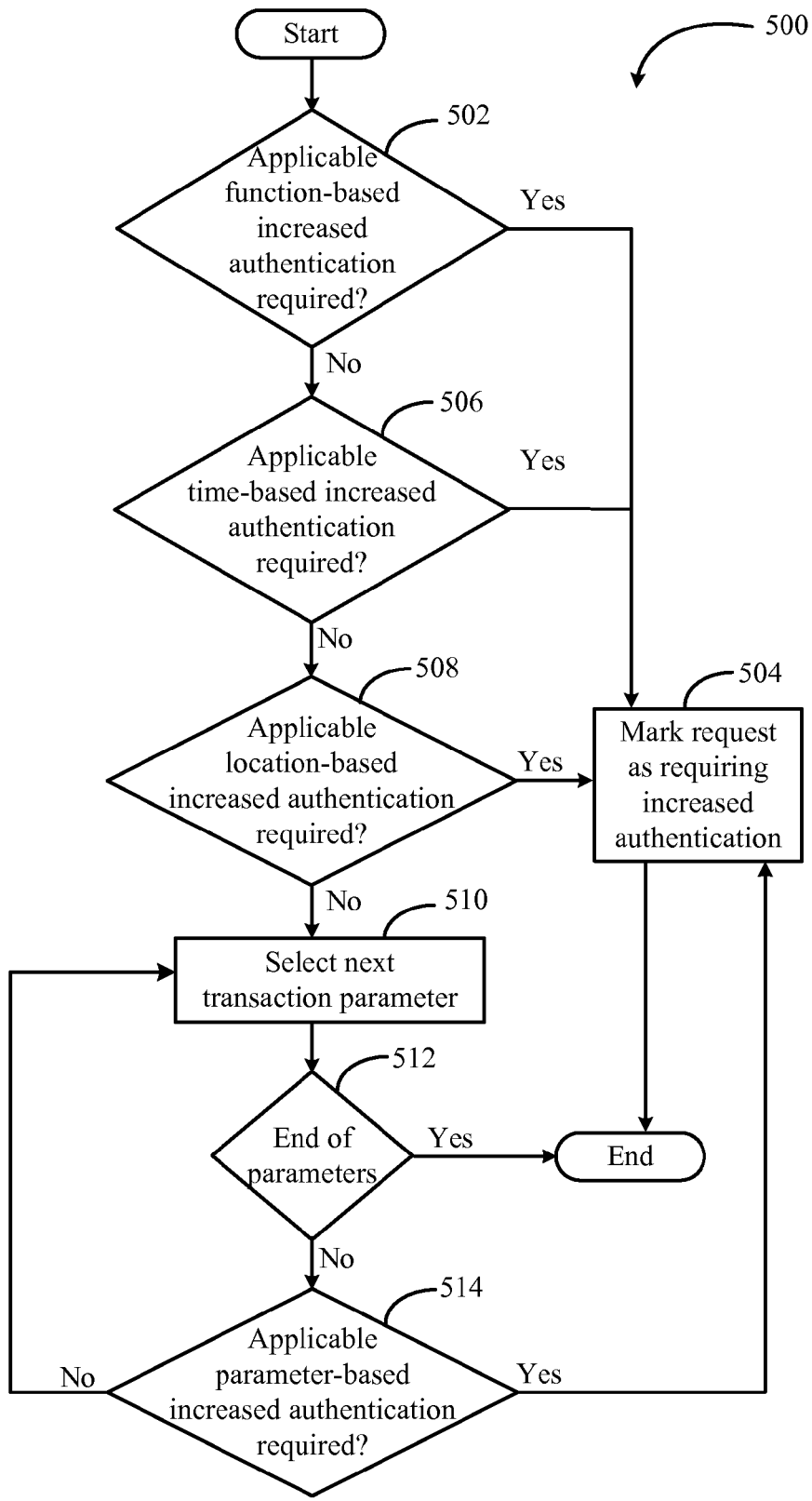
FIG. 5 is a flow diagram of an example method for identifying a type of increased authentication to be implemented, according to an example embodiment of the invention.

FIG. 5 is a flow diagram of an example method 500 for identifying a type of increased authentication to be implemented, according to an example embodiment of the invention. The operations of the method 500 illustrated in FIG. 5 are one example of the operations that may be performed at block 404 of the method 400 illustrated in FIG. 4. As such, the operations of the method 500 may be performed by one or more server computers associated with a service provider, such as the server computers 120 associated with the service provider 115 of FIG. 1. The method 500 may begin at block 502.

At block 502, a determination may be made as to whether function-based increased authentication is required for a received user request option. In other words, a determination may be made as to whether the user request satisfies an applicable function associated with increased authentication.

If it is determined at block 502 that function-based increased authentication is required, then operations may continue at block 504, and the request may be marked or designated as requiring increased authentication. If, however, it is determined at block 502 that function-based increased authentication is not required, then operations may continue at block 506.

At block 506, a determination may be made as to whether time-based increased authentication is required for the received user request option. For example, timing information associated with the user request option, such as a current time, may be compared to and/or evaluated utilizing one or more timing parameters and/or timing ranges associated with time-based increased authentication. As desired, the timing parameters and/or ranges that are utilized to evaluate the request may be determined based upon historical data associated with prior requests. Based upon the evaluation of timing information, a determination may be made as to whether time-based increased authentication is required. If it is determined at block 506 that time-based increased authentication is required, then operations may continue at block 504, and the request may be marked or designated as requiring increased authentication. If, however, it is determined at block 506 that time-based increased authentication is not required, then operations may continue at block 508.

At block 508, a determination may be made as to whether location-based increased authentication is required for the received user request option. For example, location information associated with the user request option, such as a network location or network address from which the request originated, may be compared to and/or evaluated utilizing one or more location parameters, such as a list of one or more pre-approved locations. As desired, the location parameters that are utilized to evaluate the request may be determined based upon historical data associated with prior requests. Based upon the evaluation of location information, a determination may be made as to whether location-based increased authentication is required. If it is determined at block 508 that location-based increased authentication is required, then operations may continue at block 504, and the request may be marked or designated as requiring increased authentication. If, however, it is determined at block 508 that location-based increased authentication is not required, then operations may continue at block 510.

In addition to or as an alternative to function-based, time-based, and/or location-based increased authentication, a wide variety of parameters associated with the user request may be evaluated in order to determine whether parameter-based increased authentication is required. For example, various increased authentication profiles and/or stored increased authentication information may specify parameters that are to be evaluated and/or compared to one or more increased authentication conditions. At block 510, a next parameter associated with the user request may be selected for evaluation. At block 512, a determination may be made as to whether the end of the set of parameters associated with the request (e.g., the request parameters that are evaluated) has been reached. If it is determined at block 512 that the end of the parameters has been reached, then the method may end. If, however, it is determined at block 512 that the end of the set of parameters has not been reached, then operations may continue at block 514.

At block 514, a determination may be made as to whether increased authentication is required based upon the selected parameter. For example, a value of the selected parameter may be compared to a threshold value and/or a range of values. Based at least in part upon the comparison, a determination may be made as to whether parameter-based increased authentication is required. As desired, the threshold values or other values that are utilized to evaluate the selected parameter may be determined based upon historical data associated with prior requests. If it is determined at block 514 that parameter-based increased authentication is required, then operations may continue at block 504, and the request may be marked or designated as requiring increased authentication. If, however, it is determined at block 514 that parameter-based increased authentication is not required, then operations may continue at block 510 and a next transaction parameter associated with the user request may be selected for evaluation.

Although the method 500 of FIG. 5 describes a sequential process in which function-based, time-based, location-based, and/or parameter-based conditions are analyzed, it will be appreciated that any number of increased authentication conditions may be utilized to evaluate a received user request. Additionally, a condition that triggers increased authentication may include a wide variety of different types of parameters and/or triggers. For example, increased authentication may be triggered if both a location-based parameter and a time-based parameter are satisfied. Further, as desired, a single user request may trigger multiple types of increased authentication. In certain embodiments, if multiple types of increased authentication are triggered, then a plurality of respective increased authentication methods may be utilized to authenticate the user. In other embodiments, the multiple types of increased authentication may be ranked or prioritized, and an increased authentication method associated with a highest priority increased authentication condition may be utilized to authenticate the user.

The method 500 may end following block 504.

The operations described and shown in the methods 200, 300, 400, 500 of FIGS. 2-5 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-5 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A system, comprising:
   at least one memory storing computer-executable instructions; and
   at least one processor configured to access the at least one memory and execute the computer-executable instructions to:
   receive, on behalf of a user, a user request associated with a user request option available via an online service;
   receive, on behalf of the user, an indication of an increased authentication condition for association with the user request option;
   generate increased authentication data comprising i) data indicative of the increased authentication condition and ii) data indicative of an increased authentication mechanism that is triggered upon satisfaction of the increased authentication condition;
   store the increased authentication data in association with a user profile of the user;
   determine that the user request satisfies the increased authentication condition;
   determine, from the increased authentication data, the increased authentication mechanism associated with the increased authentication condition;
   generate an increased authentication challenge in accordance with the increased authentication mechanism;
   transmit the increased authentication challenge for presentation to the user;
   receive, on behalf of the user, a challenge response to the increased authentication challenge;
   determine that the challenge response is valid; and
   enable further processing of the user request based at least in part on determining that the challenge response is valid.

2. The system of claim 1, wherein the at least one processor is further configured to execute the computer-executable instructions to:
   generate an increased authentication proposal associated with the user request option; and
   transmit the increased authentication proposal for presentation to the user,
   wherein the at least one processor is configured to receive the indication of the increased authentication condition by executing the computer-executable instructions to receive a proposal response to the increased authentication proposal, the proposal response comprising the indication of the increased authentication condition.

3. The system of claim 2, wherein the increased authentication proposal comprises an indication of a candidate increased authentication condition, and wherein the at least one processor is further configured to execute the computer-executable instructions to:
   determine that the proposal response indicates an acceptance of the candidate increased authentication parameter; and
   select the candidate increased authentication condition as the increased authentication condition for association with the user request option.

4. The system of claim 3, wherein the increased authentication proposal comprises an indication of a candidate increased authentication condition, and wherein the at least one processor is further configured to execute the computer-executable instructions to:
   determine that the proposal response comprises an indication of a modified increased authentication condition comprising one or more modifications to the candidate increased authentication condition; and
   select the modified increased authentication condition as the increased authentication condition for association with the user request option.

5. The system of claim 2, wherein the at least one processor is further configured to execute the computer-executable instructions to analyze user request option data associated with the user request option, wherein the at least one processor is configured to generate the increased authentication proposal by executing the computer-executable instructions to generate the increased authentication proposal based at least in part on the analysis of the user request option data.

6. The system of claim 5, wherein the user request option data comprises data associated with prior user requests corresponding to the user request option.

7. The system of claim 5, wherein the at least one processor is configured to analyze the user request option data i) asynchronously in the absence of an active communications session associated with the user request or ii) during the active communications session associated with the user request.

8. The system of claim 2, wherein the proposal response further comprises an indication of the increased authentication mechanism.

9. The system of claim 1, wherein the user request option comprises one of i) a selection of a selectable indicator presented on an interface via which the online service is accessed, ii) a type of transaction enabled by the online service, iii) a request to access specific functionality enabled by the online service, or iv) a request to access a type of information available via the online service.

10. The system of claim 1, wherein the increased authentication condition comprises one of i) a function-based condition, ii) a time-based condition, iii) a location-based condition, or iv) a parameter-based condition.

11. The system of claim 10, wherein the increased authentication condition comprises the time-based condition, and wherein the at least one processor is configured to determine that the user request satisfies the increased authentication condition by executing the computer-executable instructions to:
   determine a datestamp or a timestamp associated with the user request; and
   determine that the datestamp or the timestamp corresponds to a time period associated with the increased authentication condition.

12. The system of claim 10, wherein the increased authentication condition comprises the location-based condition, and wherein the at least one processor is configured to determine that the user request satisfies the increased authentication condition by executing the computer-executable instructions to:
   determine a location associated with a user device from which the user request is received;
   determine a set of approved locations associated with the user request option; and
   determine that the set of approved locations includes the location.

13. The system of claim 12, wherein the location comprises one of i) a network location of the user device or ii) a physical location of the user device.

14. The system of claim 10, wherein the increased authentication condition comprises the parameter-based condition, and wherein the at least one processor is configured to determine that the user request satisfies the increased authentication condition by executing the computer-executable instructions to:
   determine that the user request option is a request to initiate a transaction;
   determine a transaction parameter associated with the user request;
   determine a threshold value associated with the increased authentication condition; and
   determine that the transaction parameter exceeds the threshold value.

15. The system of claim 14, wherein the transaction parameter is a transaction amount and the threshold value is a threshold transaction amount for a single transaction or a cumulative threshold transaction amount for one or more transactions over a predetermined period of time.

16. The system of claim 10, wherein the increased authentication condition comprises the parameter-based condition, and wherein the at least one processor is configured to determine that the user request satisfies the increased authentication condition by executing the computer-executable instructions to:
   determine that the user request option is a request to initiate a transaction;
   determine a transaction parameter associated with the user request;
   determine a stored transaction parameter associated with the increased authentication condition; and
   determine that the transaction parameter matches the stored transaction parameter.

17. The system of claim 10, wherein the increased authentication condition comprises the function-based condition, and wherein the at least one processor is configured to determine that the user request satisfies the increased authentication condition by executing the computer-executable instructions to:
   determine a first value representing a number of times the user request option has been requested on behalf of the user over a predetermined time period prior to receipt of the user request;
   determine a threshold value associated with the user request option;
   increment the first value by one to generate a second value based at least in part on receipt of the user request; and
   determine that the second value exceeds the threshold value.

18. The system of claim 1, wherein the increased authentication is a first increased authentication condition, and wherein the at least one processor is further configured to execute the computer-executable instructions to:
   determine, from the increased authentication data, a second increased authentication condition associated with the user request option;
   determine that the user request satisfies the second increased authentication condition; and
   determine that the first increased authentication condition has a higher priority than the second increased authentication condition.

19. The system of claim 1, wherein the increased authentication condition is a first increased authentication condition, and wherein the at least one processor is further configured to execute the computer-executable instructions to:
   determine a second increased authentication condition associated with the user request option, wherein the first increased authentication condition corresponds to a first type of increased authentication condition and the second increased authentication condition corresponds to a second type of increased authentication condition that is different from the first type, and wherein the first type of increased authentication condition and the second type of increased authentication condition each comprise a respective one of: i) a function-based condition, ii) a time-based condition, iii) a location-based condition, or iv) a parameter-based condition; and
   determine that the user request satisfies the second increased authentication condition,
   wherein the increased authentication challenge is generated responsive to determining that the first increased authentication condition is satisfied and responsive to determining that the second increased authentication condition is satisfied.

20. A method, comprising:
   receiving, by a service provider system comprising one or more computers on behalf of a user, a user request associated with a user request option available via an online service;
   receiving, by the service provider system on behalf of the user, an indication of an increased authentication condition for association with the user request option;
   generating, by the service provider system, increased authentication data comprising i) data indicative of the increased authentication condition and ii) data indicative of an increased authentication mechanism that is triggered upon satisfaction of the increased authentication condition;
   storing, by the service provider system, the increased authentication data in association with a user profile of the user;
   determining, by the service provider system, that the user request satisfies the increased authentication condition;

determining, by the service provider system from the increased authentication data, the increased authentication mechanism associated with the increased authentication condition;

generating, by the service provider system, an increased authentication challenge in accordance with the increased authentication mechanism;

transmitting, by the service provider system, the increased authentication challenge for presentation to the user;

receiving, by the service provider system on behalf of the user, a challenge response to the increased authentication challenge;

determining, by the service provider system, that the challenge response is valid; and enabling, by the service provider system, further processing of the user request based at least in part on determining that the challenge response is valid.

21. The method of claim 20, further comprising:

generating, by the service provider system, an increased authentication proposal associated with the user request option; and transmitting, by the service provider system, the increased authentication proposal for presentation to the user, wherein receiving the indication of the increased authentication condition comprises receiving, by the service provider system on behalf of the user, a proposal response to the increased authentication proposal, the proposal response indicating the increased authentication condition.

* * * * *